United States Patent
Willig et al.

(10) Patent No.: US 8,988,996 B2
(45) Date of Patent: Mar. 24, 2015

(54) METHOD FOR CONTROLLING PTM SERVICE TRANSMISSION

(75) Inventors: Johannes Willig, Herzogenrath (DE); Thorsten Lohmar, Aachen (DE); Sabine Sories, Cologne (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 438 days.

(21) Appl. No.: 13/392,578

(22) PCT Filed: Sep. 1, 2009

(86) PCT No.: PCT/EP2009/006327
§ 371 (c)(1),
(2), (4) Date: May 14, 2012

(87) PCT Pub. No.: WO2011/026499
PCT Pub. Date: Mar. 10, 2011

(65) Prior Publication Data
US 2012/0250503 A1 Oct. 4, 2012

(51) Int. Cl.
*H04L 12/26* (2006.01)
*H04W 72/00* (2009.01)

(52) U.S. Cl.
CPC ................................... *H04W 72/005* (2013.01)
USPC .......................................................... 370/230

(58) Field of Classification Search
None
See application file for complete search history.

(56) References Cited

U.S. PATENT DOCUMENTS

| | | | |
|---|---|---|---|
| 2004/0077354 A1 | 4/2004 | Jason et al. | |
| 2004/0198371 A1 | 10/2004 | Balasubramanian et al. | |
| 2005/0147040 A1* | 7/2005 | Vayanos et al. | 370/235 |
| 2005/0281270 A1* | 12/2005 | Kossi et al. | 370/395.5 |
| 2008/0267109 A1 | 10/2008 | Wang et al. | |
| 2011/0051646 A1* | 3/2011 | Rice | 370/312 |

FOREIGN PATENT DOCUMENTS

EP     2046090 A1     4/2009

* cited by examiner

*Primary Examiner* — Minh-Trang Nguyen
(74) *Attorney, Agent, or Firm* — Coats & Bennett, P.L.L.C.

(57) ABSTRACT

The present disclosure relates to the field of multicast/broadcast transmission of content data. A method embodiment for controlling transmission of a PTM service from a content source 102 to a plurality of recipients 120, 122, 124 in a service area, wherein the service area is arranged at a higher hierarchy level and comprises a plurality of local areas arranged at a lower hierarchy level, comprises receiving location information indicating a location in the service area; determining an input traffic load of the PTM service to be transmitted to the service area; selecting the service area or a subset of one or more of the local areas contained in the service area as a destination area for the PTM service, wherein the selection is based on the received location information and the input traffic load; and controlling transmission of the PTM service to the selected destination area.

18 Claims, 7 Drawing Sheets

METHOD FOR CONTROLLING PTM SERVICE TRANSMISSION

TECHNICAL FIELD

The invention generally relates to the field of multicast/broadcast transmission of content data. More specifically, the invention relates to a technique for controlling transmission of a Point-to-Multipoint service from a content source to a plurality of recipients in a service area.

BACKGROUND

Telephony, messaging and on-demand streaming services are examples for Point-to-Point (PTP) or unicast communication services. Broadcast and multicast services, on the other hand, are based on Point-to-Multipoint (PTM) communication. Using PTM communication, content (such as voice, text, graphics or multimedia data) is transmitted from typically a single source to multiple destinations. PTM services include for example streaming services or file delivery services.

A broadcast PTM service of a broadcast-enabled network, for example a mobile communication network, broadcasts content data into a predetermined geographical area, i.e. a broadcast service area. The users do not need to register or join a group prior to receiving the content.

A multicast PTM service delivers content to a group of users in a particular area, i.e. a multicast service area. Prior to receiving the content, the users have to subscribe to a particular multicast group, e.g. a Multicast Subscription Group. Usually, a multicast group includes a plurality of users interested in a particular content, for example news in the field of sports, economics, politics, etc.

The 3GPP ($3^{rd}$-Generation Partnership Project) has specified broadcast and multicast services for GSM (Global System for Mobile Communications) and UMTS (Universal Mobile Telecommunication System) networks, namely the Multimedia Broadcast and Multicast Service (MBMS) feature. The feature is documented for example in the 3GPP TS (Technical Specification) 23.246 and in the TS 26.346. MBMS adds a plurality of broadcast/multicast-related techniques to conventional GSM or UMTS networks. For performing these techniques, a functional entity is specified that controls the broadcast multicast delivery of services, which is called the Broadcast/Multicast Service Center (BM-SC).

Within MBMS, the BM-SC is responsible for providing and delivering broadcast/multicast services originating from any kind of content provider (broadcast/multicast content source), for example a video clip distribution server, automotive warning server, news server, etc. The BM-SC serves as an entry point for content-delivery services, sets up and controls MBMS transport bearers, and can additionally be used to initiate MBMS transmissions. For example, the BM-SC may provide the service announcements that signal an upcoming multicast transmission to a User Equipment (UE) being member of the related group. These announcements include all necessary information such as multicast service identifier, Internet Protocol (IP) multicast addresses, time of transmission, and media descriptions that a UE needs to join a multicast session.

Each broadcast/multicast service is related to a service area (broadcast/multicast service area), which is the geographical area or zone within which the content can be broadcasted/multicasted or transmitted. The service area may comprise the whole PLMN (Public Land Mobile Network) of an MNO (Mobile Network Operator) or may even comprise several PLMNs, if agreed upon in a service level agreement. On the other hand, a service area may be configured to be as small as a single radio cell of a network or a plurality of radio cells. In general, a service area comprises a reasonable part of a PLMN.

Downstream of a PTM data source, each node in the network has a list of further downstream nodes to determine to which nodes it should forward MBMS content. Thus, a hierarchically organized content distribution is created with the base transceiver stations/Node B stations (e-Node B stations) serving a single radio cell each and thus forming the leaves of the distribution tree.

In many networks, the service area is allocated statically, i.e. the content is distributed to the same (fixed) destination area. For example, today's broadcast services (e.g. FM or AM broadcasts) are de-facto static. Some other, like MBMS, allow limited update capabilities for the service area allocation. In MBMS, a service area is configured individually for each multicast service, but the service area configured for this service is then not adjusted during transmission.

That is, in these existing broadcasting/multicasting solutions, it is not possible to modify the destination area for the content of the same broadcast/multicast service dynamically during a day. However, for each broadcast/multicast session, some services and applications of a broadcast/multicast service, like mobile TV, multimedia podcasting, localized news or automotive warning applications, may only be important for some of the recipients in a broadcast/multicast service area. Others may be of value for all of these recipients.

SUMMARY

Accordingly, there is a need to provide an improved and more dynamic broadcast/multicast service transmission technique.

According to a first aspect, a method for controlling transmission of a Point-to-Multipoint (PTM) service from a content source to a plurality of recipients in a service area is provided. The service area is arranged at a higher hierarchy level and comprises a plurality of local areas arranged at a local hierarchy level. The method comprises the steps of receiving location information indicating a location in the service area; determining an input traffic load of the PTM service to be transmitted to the service area; selecting the service area or a subset of one or more of the local areas contained in the service area as a destination area for the PTM service, wherein the selection is based on the received location information and the input traffic load; and controlling transmission of the PTM service to the selected designation area.

The PTM service may be a broadcast service, a multicast service or a combined broadcast/multicast service, like the Multimedia Broadcast Multicast Service (MBMS). The service area may be a broadcast service area or a multicast service area, wherein the broadcast service area is an area associated with a specific broadcast service and the multicast service area is an area in which a specific multicast service is available. When a combined broadcast/multicast service is used, the broadcast service area and the multicast service area may be the same or different from each other. The service area may be a geographical area and may represent the coverage area of an entire PLMN or one or more cells of the PLMN's coverage area. For example, the multicast service area is the sum of all local multicast areas offering the same service.

The service area is arranged at a higher hierarchy level and comprises a plurality of typically smaller local areas, for example local broadcast areas or local multicast areas, arranged at a lower hierarchy level. A local area is an area of the PTM service, where the service content is the same. For example, one multicast service has different content in different local multicast areas or has the same content in a first subset and a different content in a second subset of local multicast areas. One or more of the local areas arranged at the lower hierarchy level may each comprise a plurality of further local areas arranged at an even lower hierarchy level.

The location information may be data that is input by a service operator in order to indicate a location in the service area. The location information may be received together with the PTM service, e.g. together with a message or stream of the service, or may be received separately. The BM-SC in the network architecture of the PTM service may comprise a Dynamic Broadcast Adaptor (DBA) that is adapted to perform at least some of the method steps outlined herein. For example, the DBA is adapted to determine the input traffic load of the PTM service received from a content source. Alternatively, the input traffic load can be measured elsewhere and can be received by the DBA with a message containing the measured input traffic load.

In order to select the service area or the subset of one or more of the local areas as a destination area for the PTM service, the service area may be selected as the distinction area if the input traffic load is lower than resources allocated for the PTM service in the service area and the subset of one or more of the local areas may be selected as the destination area if the input traffic load is higher than the allocated resources. The allocated resources are the resources adapted to handle the PTM service in the service area, e.g. the traffic load is adapted to "fit" to the allocated resources (the traffic load is mapped to the resources). If, for example, the whole set of resources allocated for the PTM service in the service area is already handling the input traffic load and the input traffic load is increased (the traffic load becomes higher than to "fit" to allocated resources), the subset of one or more of the local areas may be selected. If, however, resources in the subset of one or more of the local areas are initially allocated for handling the PTM service in these local areas and the input traffic load is decreased (the traffic load becomes lower than to "fit" to allocated resources), the service area (containing more recipients than the subset) is selected as the destination area in order to increase the number of potential recipients of the service.

The size of the destination area may be dynamically adjusted periodically or with every received message of the PTM service. In this respect, the size of the destination area may be dynamically selected by at least one of expanding the destination area from the subset of one or more of the local areas to the service area if the input traffic load becomes lower than resources available or allocated for the PTM service in the service area, and shrinking the destination area from the service area to the subset of one or more of the local areas contained in the service area if the input traffic load becomes higher than the available or allocated resources. In this way, the number of potential recipients in the service area can be dynamically adjusted (increased or decreased) dependent on the input traffic load. The traffic load may have a certain geographical relevance. If the traffic load increases, there is more information (more traffic messages) per square kilometer, and if the traffic load decreases there is less information (less traffic messages) per square kilometer. Thus, shrinking the service area may be understood as "filtering" the traffic load to be more relevant for the target service area. In this way it may be ensured that the recipients, for which the service is most relevant, receive service.

If the input traffic load of a multicast or a broadcast service is too high to be handled by the resources allocated for this service, the number of potential recipients, e.g. User Equipments (UEs) or other user terminals, may be reduced by shrinking the destination area to the subset of one or more local areas. This ensures that the recipients in the selected subset receive the multicast service. The mechanism for decreasing the service area if the input traffic load becomes higher than the allocated resources may be understood as breaking the traffic load down into pieces by transmitting the service not to the whole service area, but to the subset of one or more local areas. If, e.g. later on, the input traffic load is not high enough to fully load the allocated resources, the destination area may be re-expanded to its original size (the size of the service area). The mechanism or re-expanding the subset of one or more local areas may also be performed in a step-wise manner, e.g. in a first step a first subset of local areas (e.g. people close to a certain location) get the service with a very high priority and then, in a second step, the first subset may be further expanded to a second subset containing more local areas so that users in a wider range receive the information. Finally, if there is a lot of unused resource, the second subset may be further expanded so that almost everybody gets it. This mechanism may either be adjusted to send as much data as possible (until the throughput limit is reached), or to save resources, i.e. the service is only transmitted in high priority regions. This allows more potential recipients to receive the PTM service. However, this mechanism may also be used to save resources if wanted, i.e. messages may only be transmitted to a minimum large local area with high priority (relevance) or to some medium large local area with medium priority (relevance) or to the whole service area (everywhere) with low priority (relevance).

Alternatively or additionally, the method may further comprise at least one of decreasing the allocated resources if the input traffic load is lower than the allocated resources and increasing the allocated resources if the input traffic load is higher than the allocated resources. For example, it is, in a first step determined whether an adapted input traffic load can still be handled by the resources allocated for the corresponding PTM service. If it is determined that the adapted input traffic load can not be handled anymore by the allocated resources (the input traffic load is higher than the allocated resources), the destination area can be shrinked from the service area to the subset of one or more local areas and/or additional resources can be made available in the service area. The former may have the advantage of decreasing the network load, because the number of potential recipients is reduced by shrinking the destination area, which may save network resources. If it is determined that an adapted input traffic load does not fully load the resources allocated for the corresponding PTM service in the subset of one or more local areas, the destination area may be expanded from the subset to either a larger subset containing more of the local areas or to the service area so as to increase the number of potential recipients and/or the number of allocated resources in the service area may be reduced.

The method may further comprise the steps of receiving relevance information indicating the importance of the current input data traffic of the PTM service and/or of the PTM service for at least one of the service area and one or more of the local areas contained in the service area, and selecting the destination area by additionally considering the received relevance information. The relevance information may indicate an importance of the PTM service for at least some of the plurality of local areas contained in the service area and/or for the service area. If, for example, a subset of local areas has been previously selected as the destination area by considering the input traffic load and the location information, one or more of the local areas of the previously selected subset of local areas may be prioritized based on the relevance information. For example, it may be particularly important for one or more of the local areas to receive a certain PTM service, like an automotive warning application. In this case, the relevance information indicates that the importance of the PTM service for the one or more local areas is higher than for other local areas and the local areas for which the importance is the highest will be served first.

By considering the relevance information, the distribution of the PTM service to the plurality of local areas and/or the service area may be scheduled dependent on the importance as indicated by the relevance information (in a descending order). As mentioned above, the destination area may at first be expanded or shrinked by considering the input traffic load. It may then be determined for which local areas in the destination area the relevance information indicates the highest importance and these local areas will be served first before serving the local areas having the second highest relevance and so on.

The PTM service may comprise the transmission of a Podcast, an automotive warning, a news broadcast, or a message of a Short Message Service (SMS) or a Multimedia Message Service (MMS). The automotive warning may be a warning about traffic jams in a certain area, the news broadcast may comprise localized news of different relevance for different areas, and the SMS or MMS may be used in SMS/MMS chat shows on television where the messages may be transmitted to all viewers or only to viewers in a particular region dependent on the traffic load. The PTM service may be a Multimedia Broadcast/Multicast Service (MBMS) as defined in 3GPP and may offer both streaming and download delivering methods.

The method may further comprise the step of continuously monitoring information indicating the status of at least one of available and allocated resources in the service area. The continuously monitored information may be monitored outside the DBA, may be transmitted to the DBA and may be used in the DBA to determine whether the destination area should be expanded or shrinked and/or whether the allocated resources should be decreased or increased. In this way, the allocated resources may be adjusted based on the monitoring information.

According to a further aspect, a computer program product is proposed, comprising program code portions for performing the steps of any one of the method aspects described herein, when the computer program product is run on one or more computing devices. The computer program product may be stored on a computer readable recording medium.

According to a still further aspect, an apparatus for controlling transmission of a PTM service from a content source to a plurality of recipients in a service area is proposed. The service area is arranged at a higher hierarchy level and comprises a plurality of local areas arranged at a lower hierarchy level. The apparatus comprises a first interface for receiving location information indicating a location in the service area; and a processor for determining an input traffic load of the PTM service to be transmitted to the service area, wherein the processor is adapted to select the service area or a subset of one or more of the local areas contained in the service area as a destination area for the PTM service, wherein the selection is based on the received location information and the input traffic load, and wherein the processor is further adapted to control the transmission of the PTM service to the selected destination area. The apparatus may be or comprise a DBA or may be implemented in a DBA contained in an MB-SC.

BRIEF DESCRIPTION OF THE DRAWINGS

In the following, the invention will further be described with reference to exemplary embodiments illustrated in the figures, in which.

DETAILED DESCRIPTION

In the following description, for purposes of explanation and not limitation, specific details are set forth, such as specific network topologies including particular network nodes, communication protocols etc., in order to provide a thorough understanding of the current invention. It will be apparent to one skilled in the art that the current invention may be practiced in other embodiments that depart from these specific details. For example, the skilled artisan will appreciate that the current invention may be practiced with PTM services, multicast/broadcast mechanisms or other PTM communication features different from the 3GPP MBMS standard discussed below to illustrate the current invention. Also, the invention may be practiced in any network to which mobile or stationary users may attach. For example, the invention is applicable to, besides cellular networks, WLAN, Bluetooth, DVB or similar wireless networks, but also to wireline networks such as, for example, the intranet of a company with some or many separated subsidiaries or the Internet.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

In general, the exemplary embodiments described below are based on both multicast and broadcast transmission. Even if the exemplary embodiments presented below may only be described with respect to a multicast service and the PTM transmissions are multicast transmissions, the skilled person will understand that other PTM transmission techniques might also be used, for example a PTM technique based on broadcast transmission.

Figure 1:
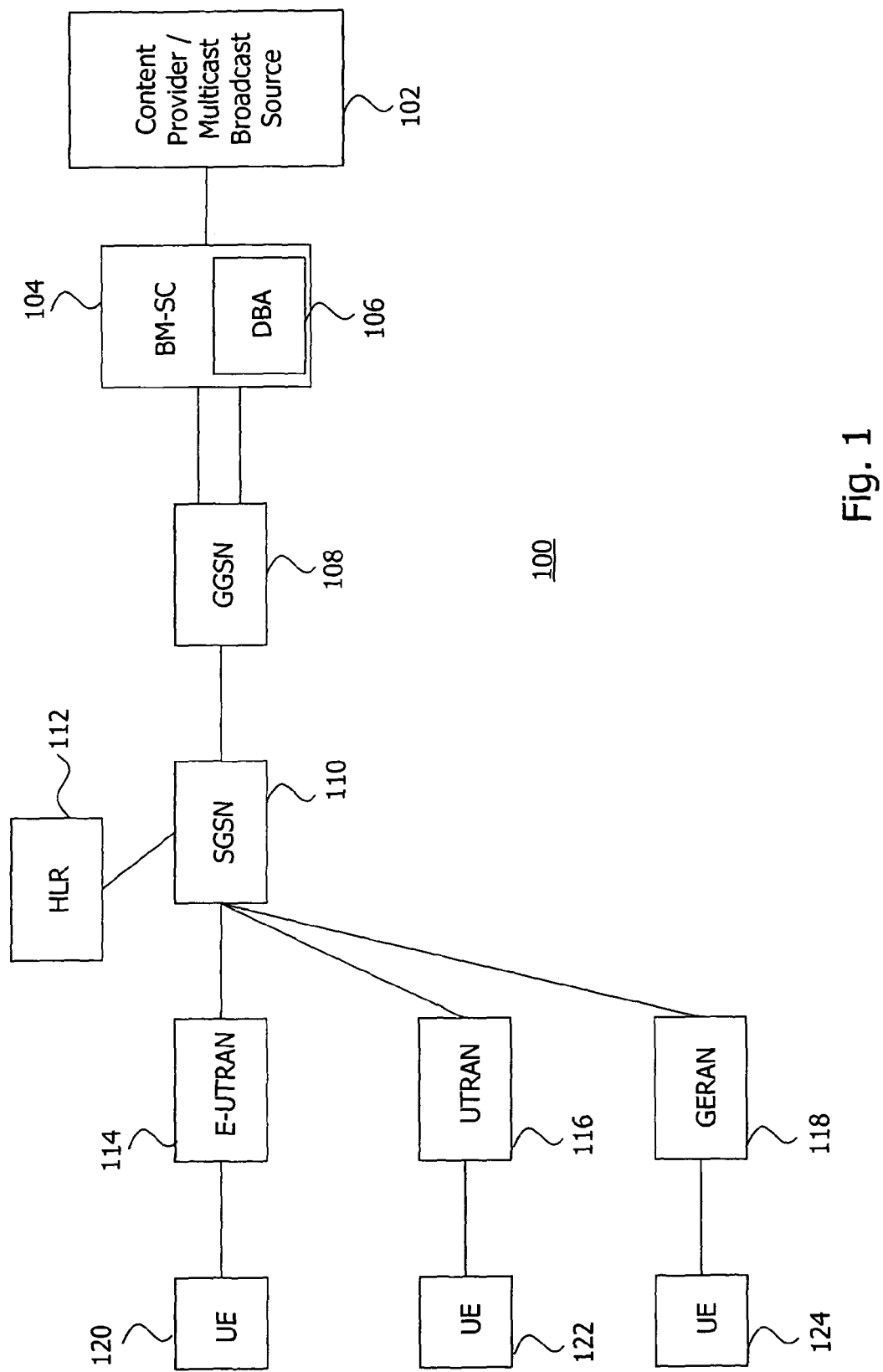
FIG. 1 is a schematic illustration of an MBMS network architecture.

With reference to FIG. 1, a MBMS network architecture 100 is schematically illustrated. The network architecture comprises a Content Provider/Multicast Broadcast Source 102 which is adapted to provide a plurality of different broadcast/multicast services like automotive warning applications, localized news, short messages etc. The multicast or broadcast service can comprise both a single on-going session (e.g. a media stream) or several intermittent services over an extended period of time (e.g. messages). The multicast or broadcast service is provided to a Broadcast/Multicast Service Center (BM-SC) 104 that includes functions for MBMS user service provisioning and delivery. The BM-SC 104 serves as an entry point for content provider MBMS transmissions, is used to authorize and initiate MBMS Bearer Services within a PLMN, and can further be used to schedule and deliver MBMS transmissions. As shown in FIG. 1, the MB-SC 104 comprises a Dynamic Broadcast Adaptor (DBA) 106, which will be described in more detail below.

The MBMS network architecture 100 further comprises a Gateway GPRS Support Node (GGSN) 108, a Serving GPRS Support Node (SGSN) 110 and a Home Location Register (HLR) 112. In the exemplary network architecture 100 of FIG. 1, exemplary radio networks are provided, i.e. an Evolved UMTS Terrestrial Radio Access Network (E-UTRAN) 114, an UMTS Terrestrial Radio Access Network (UTRAN) 116 and a GSM EDGE Radio Access Network (GERAN) 118, each of which communicating with one or more User Equipments (UEs) 120, 122, 124 within a multicast/broadcast service area. Alternatively, the MBMS network architecture 100 may only comprise one or a subset of these radio networks.

Figure 2:
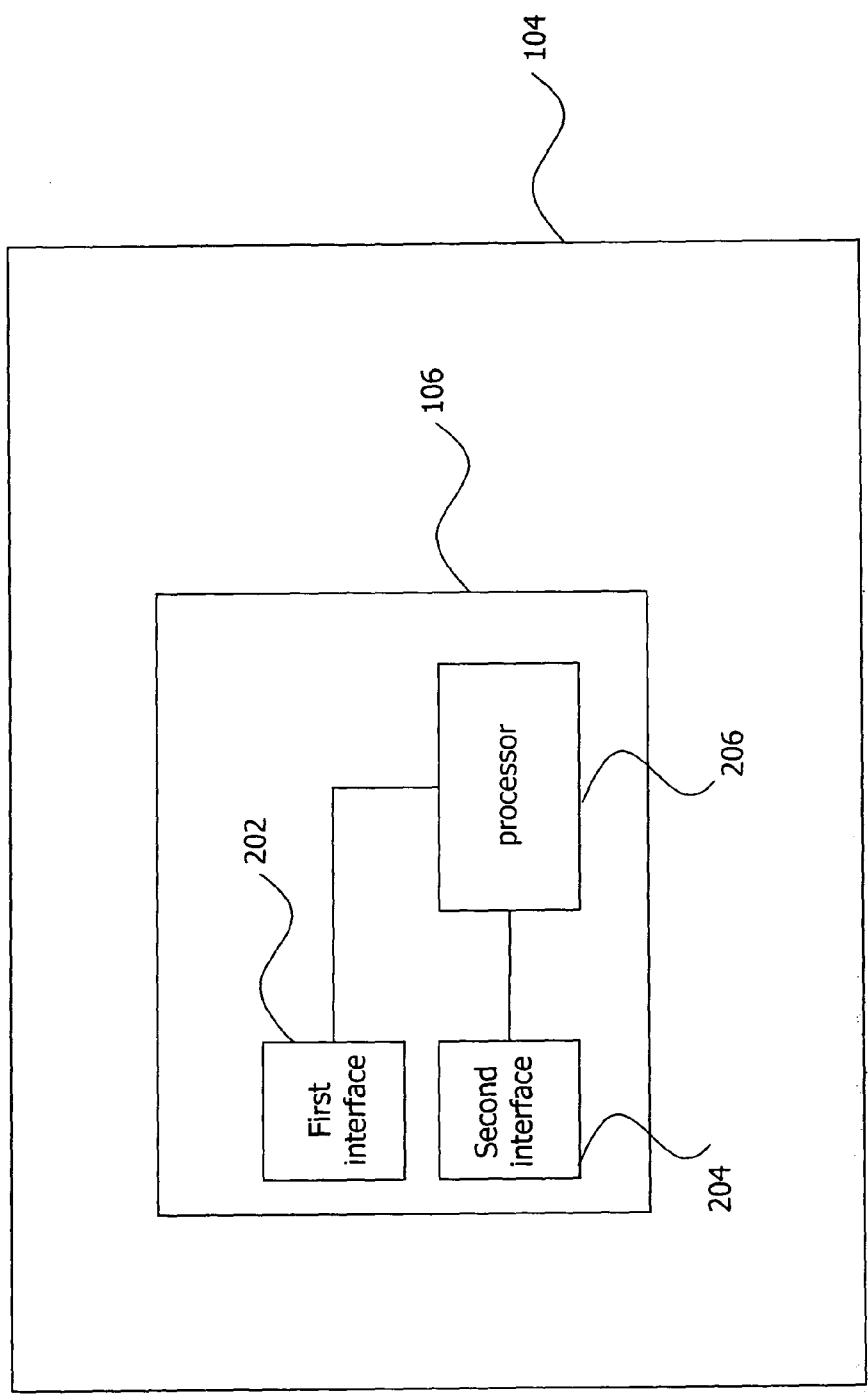
FIG. 2 is a schematic illustration of an apparatus embodiment used in the MBMS network architecture of FIG. 1.

With reference to FIG. 2, an apparatus embodiment for controlling transmission of a multicast/broadcast service is schematically illustrated. FIG. 2 illustrates the BM-SC 104 (used in the network architecture 100 of FIG. 1) which comprises the DBA 106. The DBA 106 comprises a first interface 202 for receiving location information indicating a location in the service area and a second interface 204 for receiving monitoring information indicating at least one of the status of available (unused) and allocated resources in the service area. The DBA 106 further comprises a processor 206 that is adapted to determine an input traffic load of the multicast/broadcast service to be transmitted to the service area and is adapted to select the service area or a subset containing one or more of the local areas contained in the service area as a destination area for the multicast/broadcast service. The arrangement of the local areas in the service area will in more detail described with respect to FIG. 3 and the selection of the service area or the subset of local areas will in more detail described with reference to FIGS. 3, 4a and 4b.

Figure 3:
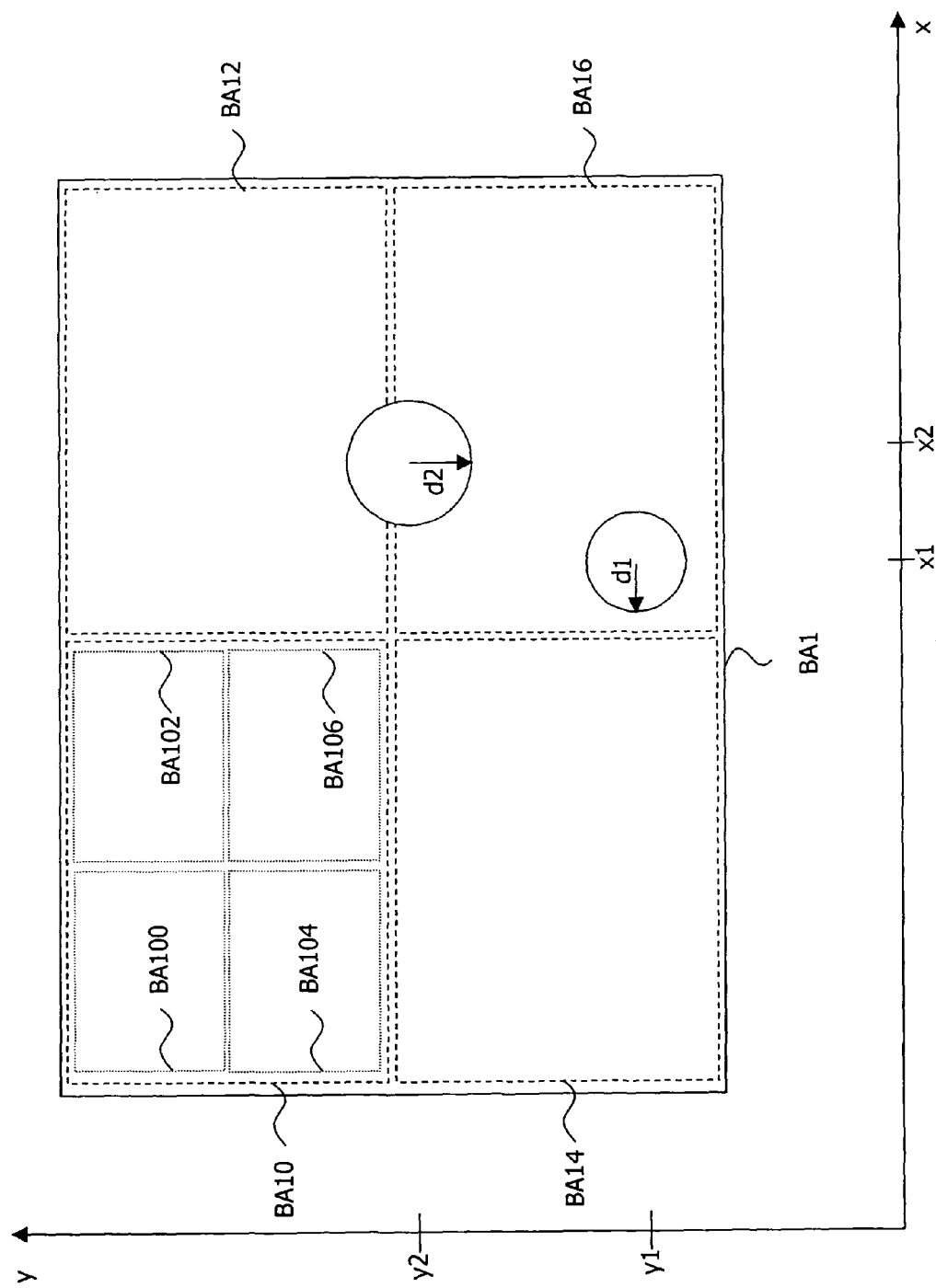
FIG. 3 is a schematic illustration of an exemplary service area comprising a plurality of local areas.

As shown in FIG. 3, the service area BA1 and the local areas BA10, BA12, BA14, BA16 contained therein are arranged in a hierarchical manner. The service area BA1 is arranged at a higher hierarchy level and exemplarily comprises four local areas BA10, BA12, BA14, BA16 at a lower hierarchy level. As exemplarily shown with respect to the local area BA10, one or more of the local areas BA10, BA12, BA14, BA16 may comprise further local areas BA100, BA102, BA104, BA106 at an even lower hierarchy level. When a message or stream of the multicast/broadcast service and location information related to this message (or stream) is received by the DBA 106, the DBA 106 is adapted to select the destination area for this message (or stream) as follows.

For example, a message m1 and location information related to the message m1 are received by the DBA together or independently, wherein the location information comprises (x, y)-coordinates (x1, y1) and a diameter d1. The (x, y)-coordinates (x1, y1) indicate a position within the service area BA1 and form the center of a circle with the diameter d1, wherein the circle indicates the intended destination for the message m1. As shown in FIG. 3, this circle lies in the local area BA16 as well as in the service area BA1. Thus, both areas BA1, BA16 are potential options for the destination area for the message m1. In order to select the service area BA1 or the local area BA16 as the destination area for the message m1, the DBA 106 determines the input traffic load of the multicast/broadcast service by receiving information about the load as an external input. If the input traffic load is high, it is likely (e.g., in case of multicasting) that not all UEs in the whole service area BA1 can be served. Therefore, in this case, the local area BA16 containing less UEs than the service area BA1 is selected as the destination area for the message m1. This ensures that at least most of the UEs in the local area BA16 receive the message m1. If, however, the input traffic load is low, the service area BA1 is selected by the DBA 106 as the destination area for the message m1 in order to allow distribution of the message m1 to as many UEs in the service area BA1 as possible.

According to another example, a message m2 and location information related to this message is received by the DBA 106, the location information containing (x, y)-coordinates (x2, y2) and a diameter d2. In this exemplary case, the circle identified by the location information lies in the service area BA1 as well as in the local area BA12 and the local area BA16. If, in this case, the input traffic load is high, a subset of the two local areas BA12, BA16 indicated by the location information is selected as the destination area for the message m2. If, however, the input traffic load is low, the service area BA1 is selected as the destination area for the message m2. By means of the hierarchical architecture shown in FIG. 3, a flexible method for dynamically selecting the destination area for each message is provided.

Figure 4A:
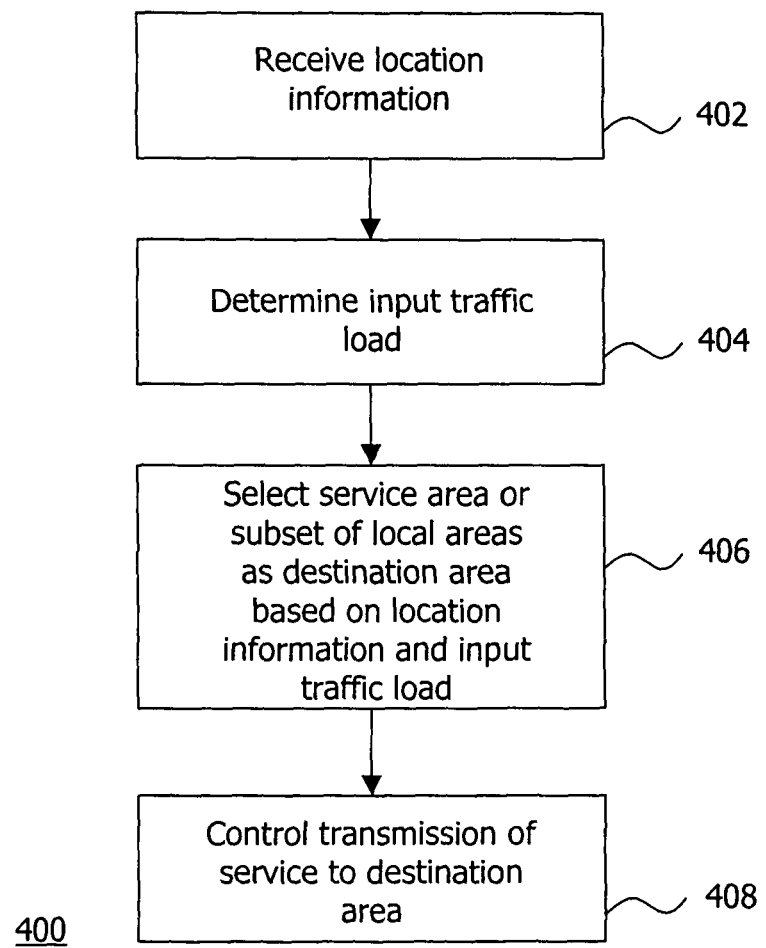
FIG. 4a is a flowchart illustrating a first method embodiment.

With reference to FIG. 4a, a first method embodiment for controlling transmission of the multicast/broadcast service to a destination area is described. Location information for a specific message (or stream) of a multicast/broadcast service is received in step 402 and the input traffic load of the multicast/broadcast service is determined (step 404) by the DBA 106. Then, as exemplarily shown in FIG. 3 for messages m1 and m2, a destination area for the message is selected based on the received location information indicating a location range in the service area and based on the input traffic load of the multicast/broadcast service (step 406). The DBA 106 then controls the transmission of the message of the multicast/broadcast service to the selected destination area (step 408).

Figure 4B:
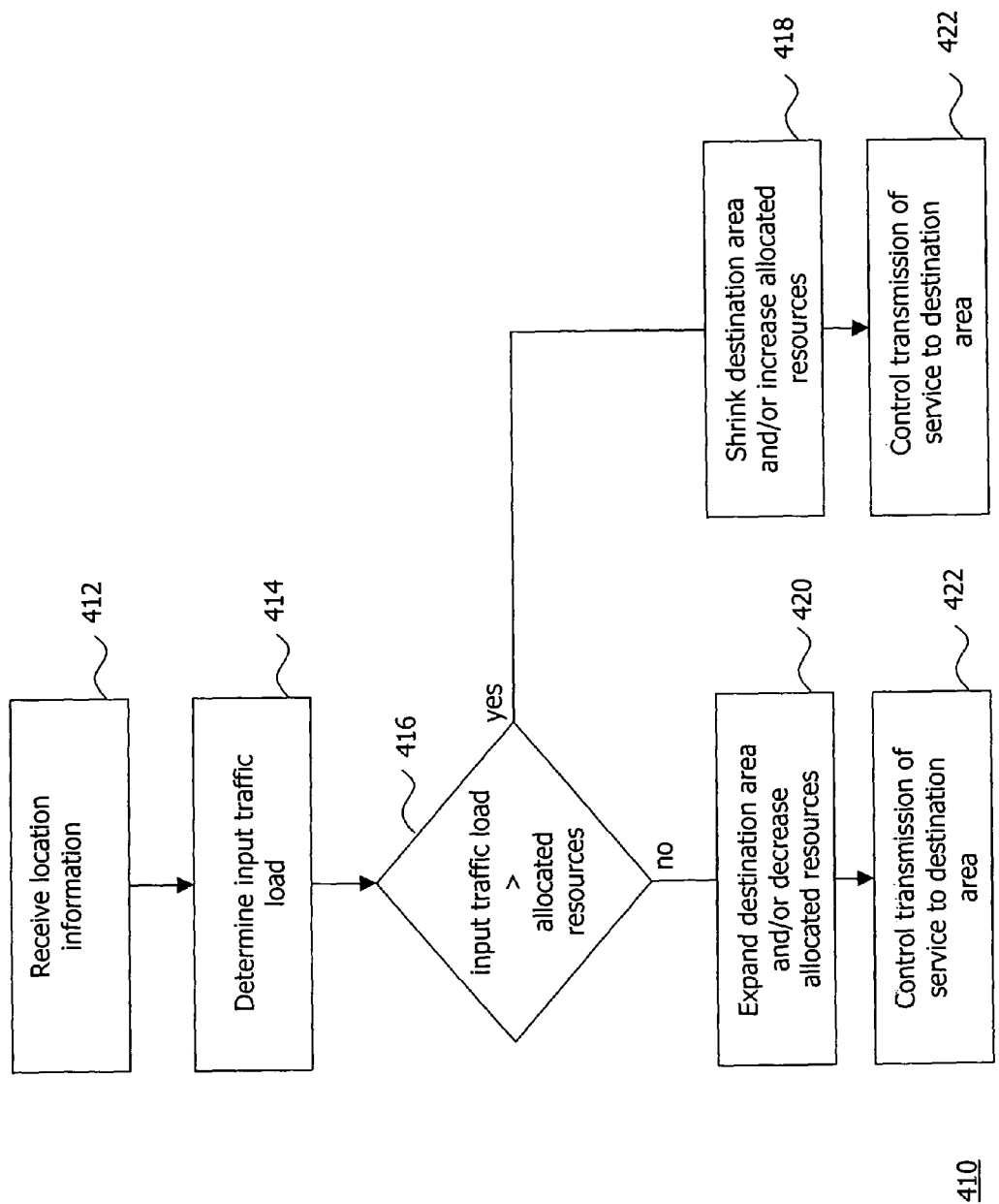
FIG. 4b is a flowchart illustrating a second method embodiment.

With reference to FIG. 4b, the dynamic selection of the destination area according to a second method embodiment is specified. The steps 412 and 414 of FIG. 4b correspond to steps 402 and 404 of FIG. 4a. In step 416, the DBA 106 determines whether the determined input traffic load is higher than the resources allocated for the multicast/broadcast service in the service area. In this respect, it is determined by the DBA 106 whether the resources allocated for the multicast/broadcast service can handle the determined input traffic load or not. If it is determined in step 416 that the allocated resources can not handle the input traffic load (the input traffic load exceeds the allocated resources), the destination area is shrinked so as to include one or more local areas identified by the location information (step 418). If it is determined that the allocated resources can handle the input traffic load (the input traffic load does not exceed the allocated resources) (step 416), the destination area is expanded so as to contain the service area (step 420). This procedure allows a dynamic adaption of the destination area dependent on the respective input traffic load.

For example, the configuration of the DBA 106 is initially set to transmit a multicast/broadcast service to the whole service area. Periodically or when a new message (or stream)

is received by the DBA 106, the DBA 106 receives or determines the input traffic load of the multicast/broadcast service (step 414). If there are enough resources (allocated for the service) available in the service area (the input traffic load does not exceed the allocated resources) (step 416), the service area is maintained as the destination area (the service area is selected) (step 420). If, however, there are not enough allocated resources available in the service area (the input traffic load exceeds the allocated resources) (step 416), the destination area is shrinked to contain a subset of one or more local areas and/or more additional (previously unused) resources are made available for the service in the service area (step 418).

When selecting the subset of one or more local areas as the destination area, the location information is considered, as outlined with respect to FIG. 3. After adjusting the destination area, the selected subset of one or more local areas can be set as the destination area in the configuration of the DBA 106.

After a certain period of time (or when a further message is received or when it is determined by the DBA 106 that the input traffic load has changed), it is determined by the DBA 106 whether there are enough resources (allocated for the multicast/broadcast service) in the subset of one or more local areas in order to handle the multicast/broadcast service or not (step 416). If there are not enough allocated resources (the input traffic load exceeds the allocated resources), the subset containing one or more local areas as the destination area is maintained or even shrinked further (the DBA 106 selects a subset of the same or less local areas as the destination area) (step 418) and/or additional (previously unused) resources are made available in the subset of the local areas. If there are enough resources allocated for the multicast/broadcast service in the subset (the input traffic load does not exceed the allocated resources), the destination area is expanded to the service area and/or the allocated resources are reduced (step 420).

In this way, the transmission of the multicast/broadcast service to a certain destination area can be dynamically controlled and adjusted (step 422).

Figure 5A:
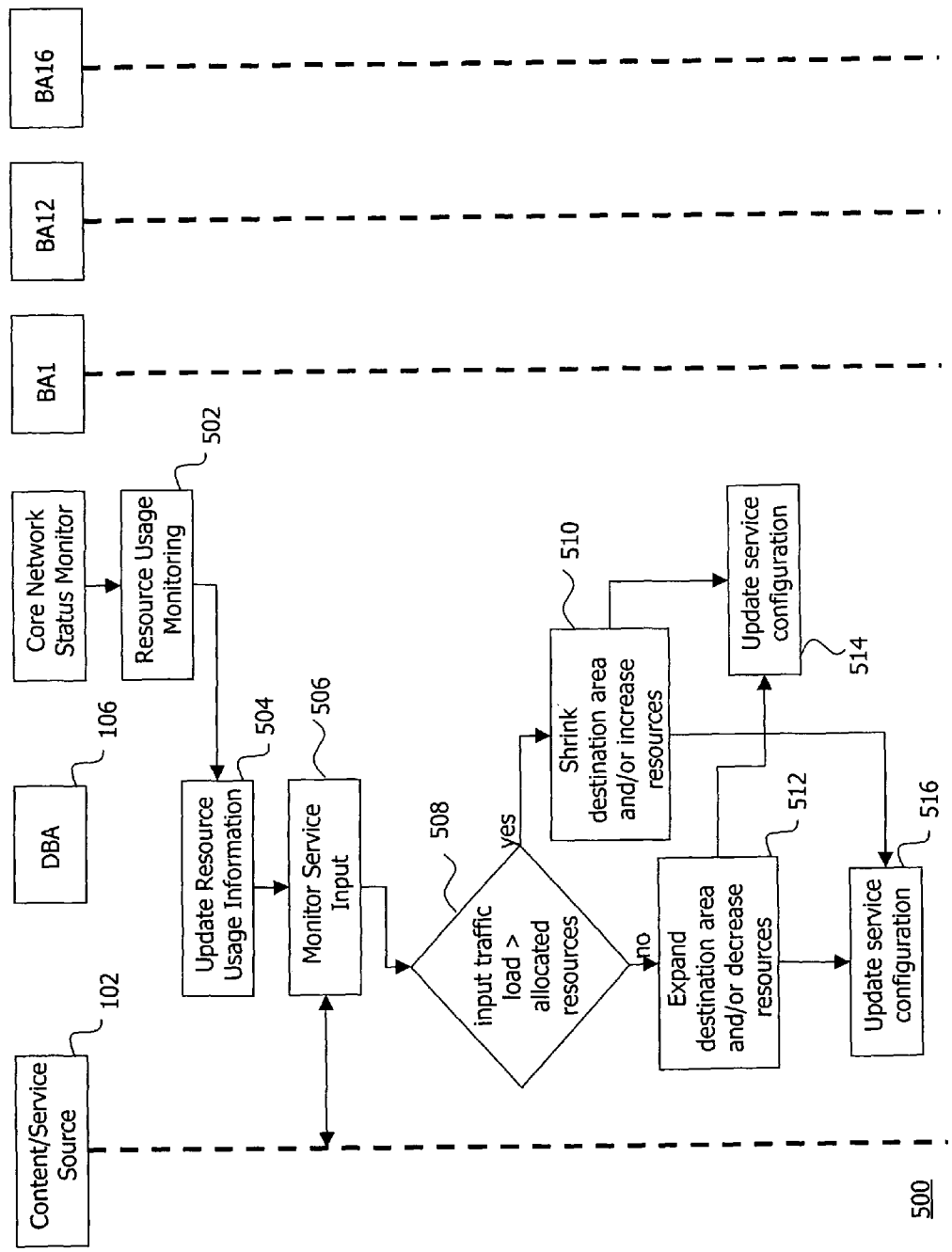
FIG. 5a is a block diagram illustrating a first part of a third method embodiment.
Figure 5B:
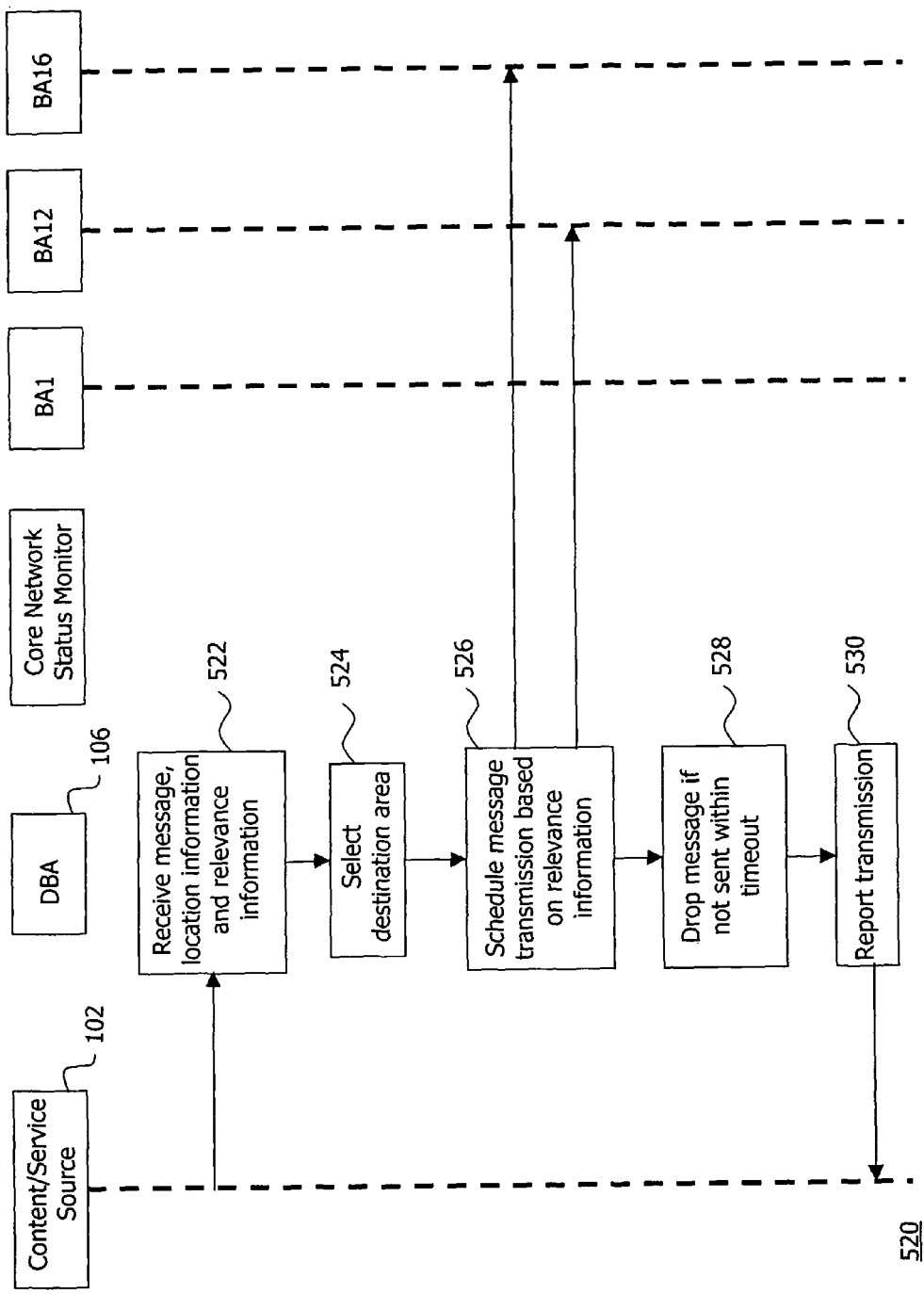
FIG. 5b is block diagram illustrating a second part of the third method embodiment.

The whole procedure of updating the configuration of the DBA 106 and controlling transmission of the multicast/broadcast service according to a third method embodiment is described with respect to FIGS. 5a and 5b. At first, the Core Network (CN) and Radio Access Network (RAN) components continuously monitor the status of used and available (unused) resources in the CN and RAN for the multicast/broadcast service (step 502) and the status information is periodically sent to the DBA 106, which then updates the resource usage information stored in the DBA 106 (step 504). The DBA 106 also monitors the input traffic load (input data volume) for the multicast/broadcast service (step 506). Together with the knowledge of used and available resources, this results in an up-to-date overview of supply and demand for all multicast/broadcast resources at the DBA 106.

Based on the monitoring input received at the DBA 106 (the input traffic load and the resource information), the DBA 106 adapts the multicast/broadcast service configuration in steps 508 to 516. The DBA 106 determines whether the input traffic load exceeds the allocated resources for the multicast/broadcast service (step 508) and expands or shrinks the destination area (as explained above) based on the result of this determination (steps 510 and 512). In addition to or as an alternative to expanding or shrinking the destination area, the resources allocated for the multicast/broadcast service can be adjusted (increased or decreased), respectively. The results of this dynamic multicast/broadcast service configuration are sent as updates to the CN (step 514) and are stored internally in the DBA 106 (step 516) to influence the transmission of the multicast/broadcast service to the respective destination area.

FIG. 5b illustrates how a sample message of the multicast/broadcast service is processed by the updated DBA 106. An incoming message consists of the message content plus a set of location information (as explained above) and relevance information (step 522). The relevance information indicates different relevancies for different areas of the service area, e.g. different relevancies for different local service areas. The message is then mapped by the DBA 106 to the destination area indicated by the location information (step 524). For example, it has been previously determined in step 508 and configured in steps 514 and 516 that the destination area should be shrinked due to high traffic load. In this case, for the message m2 covering two local areas, namely local area BA12 and local area BA16, the local areas BA12 and BA16 will form the destination area. If the relevance information for these local areas BA12 and BA16 is the same, the DBA 106 sends the message m2 to both local areas BA12 and BA16 simultaneously.

If, however, the relevance information for one of the local areas, e.g. the local area BA16, is higher than for the other local area, the local area BA12, the DBA 106 prioritizes the (more important) local area BA16 and schedules the transmission of the message m2 by considering the relevance information (step 526). That is, the message m2 will at first be sent to the local area BA16 and if this transmission is completed and at least the most of the UEs in the local area BA16 have received the message m2, the DBA 106 sends the message m2 to the local area BA12. Optionally, the DBA 106 decides not to schedule low-relevant messages in areas with very high traffic load and drop them (step 528). Finally, the transmission report is reported to the Content/Service Source (step 530).

By additionally considering relevance information, it is ensured that the UEs in the area(s) for which the message as the highest importance actually receive the message. For example, if an automotive warning is only relevant for UEs in the local area BA16, it is ensured that the UEs in this area actually receive the warning.

In this way, a dynamic adaption of the multicast/broadcast service is provided which considers local relevance of the multicast/broadcast service and the actual network load. For service providers, it ensures that the most important local information is received over less important general information on national or regional level. For network operators, a detection of unused network resources and the mechanisms to free up these resources allow a more efficient and also energy saving operation of the multicast/broadcast network.

For Service Receivers, service area reallocation can happen without disturbance of end user or change of reception for the UE. Additionally, any locally relevant content can be embedded in regional or national services.

It is believed that many advantages of the current invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:
1. A method for controlling transmission of a Point-To-Multipoint (PTM) service from a content source to a plurality of recipients in a service area, wherein the service area is arranged at a higher hierarchy level and comprises a plurality of local areas arranged at a lower hierarchy level, comprising the steps of:
  receiving location information indicating a location in the service area;
  determining an input traffic load of the PTM service to be transmitted to the service area;
  selecting the service area or a subset of one or more of the local areas contained in the service area as a destination area for the PTM service based on the received location information and the input traffic load;
  controlling transmission of the PTM service to the selected destination area.

2. The method of claim 1 wherein said selecting the service area or a subset of one or more of the local areas contained in the service area as the destination area for the PTM service comprises:
  selecting the service area as the destination area in response to the input traffic load being lower than resources allocated for the PTM service in the service area;
  selecting the subset of one or more of the local areas as the destination area in response to the input traffic load being higher than the resources allocated for the PTM service in the service area.

3. The method of claim 2 further comprising at least one of:
  decreasing the allocated resources in response to the input traffic load being lower than the resources allocated for the PTM service in the service area;
  increasing the allocated resources in response to the input traffic load being higher than the resources allocated for the PTM service in the service area.

4. The method claim 2 further comprising continuously monitoring information indicating the status of at least one of available and allocated resources in the service area.

5. The method of claim 4 further comprising adjusting the allocated resources based on the monitoring information.

6. The method of claim 1 wherein the size of the destination area is dynamically selected by at least one of:
  expanding the destination area from the subset of one or more of the local areas to the service area in response to the input traffic load becoming lower than resources available or allocated for the PTM service in the service area;
  shrinking the destination area from the service area to the subset of one or more of the local areas contained in the service area in response to the input traffic load becoming higher than the resources available or allocated for the PTM service in the service area.

7. The method of claim 1:
  further comprising receiving relevance information indicating the importance of the current input data traffic of the PTM service;
  wherein selecting the destination area comprises selecting the destination area based on the received relevance information.

8. The method of claim 7 wherein the relevance information indicates an importance of the PTM service for at least some of the plurality of local areas contained in the service area.

9. The method of claim 8 further comprising scheduling distribution of the PTM service to the plurality of local areas based on the importance as indicated by the relevance information.

10. The method of claim 1 wherein the PTM service comprises at least one of: a Podcast, an automotive warning, a news broadcast, a message of a Short Message Service, and a message of a Multimedia Message Service.

11. The method of claim 1 wherein the PTM service is a Multimedia Broadcast Multicast Service.

12. A computer program product stored in a non-transient computer readable medium for controlling transmission of a Point-To-Multipoint (PTM) service from a content source to a plurality of recipients in a service area, wherein the service area is arranged at a higher hierarchy level and comprises a plurality of local areas arranged at a lower hierarchy level, the computer program product comprising software code instructions which, when run on a computer system, causes the computer system to:
  receive location information indicating a location in the service area;
  determine an input traffic load of the PTM service to be transmitted to the service area;
  select the service area or a subset of one or more of the local areas contained in the service area as a destination area for the PTM service based on the received location information and the input traffic load;
  control transmission of the PTM service to the selected destination area.

13. An apparatus for controlling transmission of a Point-To-Multipoint (PTM) service from a content source to a plurality of recipients in a service area, wherein the service area is arranged at a higher hierarchy level and comprises a plurality of local areas arranged at a lower hierarchy level, comprising:
  a first interface configured to receive location information indicating a location in the service area;
  a processor operatively connected to the first interface and configured to:
    determine an input traffic load of the PTM service to be transmitted to the service area;
    select the service area or a subset of one or more of the local areas contained in the service area as a destination area for the PTM service based on the received location information and the input traffic load;
    control the transmission of the PTM service to the selected destination area.

14. The apparatus of claim 13 wherein the processor is configured to:
  select the service area as the destination area in response to the input traffic load being lower than resources allocated for the PTM service in the service area;
  select the subset of one or more of the local areas as the destination area in response to the input traffic load being higher than the allocated resources.

15. The apparatus of claim 14:
  further comprising a second interface configured to receive monitoring information indicating at least one of the status of available and allocated resources in the service area;
  wherein the processor is further configured to adjust the resources allocated to the PTM service based on the monitoring information.

16. The apparatus of claim 13 wherein the processor is configured to dynamically select the size of the destination area by at least one of:
  expanding the destination area from the subset of one or more of the local areas to the service area in response to the input traffic load becoming lower than resources available or allocated for the PTM service in the service area;
  shrinking the destination area from the service area to the subset of one or more of the local areas contained in the service area in response to the input traffic load becoming higher than the available or allocated resources.

17. The apparatus of claim 16 wherein the processor is further configured to cause at least one of:
decreasing the allocated resources in response to the input traffic load being lower than the allocated resources;
increasing the allocated resources in response to the input traffic load being higher than the allocated resources.

18. The apparatus of claim 13:
wherein the first interface is further configured to receive relevance information indicating the importance of the PTM service;
wherein the processor is further configured to select the destination area based on the received relevance information.

* * * * *